(12) United States Patent
Van Den Aker

(10) Patent No.: US 6,986,821 B2
(45) Date of Patent: Jan. 17, 2006

(54) METHOD AND DEVICE FOR FORMING A LONGITUDINAL FIBER WEB

(75) Inventor: Martinus Cornelus Adrianus Van Den Aker, Tilburg (NL)

(73) Assignee: Beiler Beheer B.V., (NL)

( * ) Notice: Subject to any disclaimer, the term of this patent is extended or adjusted under 35 U.S.C. 154(b) by 0 days.

(21) Appl. No.: 10/277,590

(22) Filed: Oct. 21, 2002

(65) Prior Publication Data

US 2003/0070745 A1    Apr. 17, 2003

Related U.S. Application Data

(63) Continuation of application No. PCT/NL01/00316, filed on Apr. 20, 2001.

(30) Foreign Application Priority Data

Apr. 20, 2000    (NL)    .................................... 1014995

(51) Int. Cl.
*D04H 13/00* (2006.01)
*D04H 3/04* (2006.01)

(52) U.S. Cl. ....................... 156/178; 156/181; 156/324

(58) Field of Classification Search ........ 156/178–181, 156/324

See application file for complete search history.

(56) References Cited

U.S. PATENT DOCUMENTS

| 3,591,434 A | 7/1971 | Hartstein | ..................... 156/178 |
| 5,863,368 A * | 1/1999 | Perrin | ......................... 156/177 |

FOREIGN PATENT DOCUMENTS

| CH | 441727 | 8/1967 |
|---|---|---|
| DE | 4010086 | 11/1990 |
| DE | 19534627 | 3/1997 |
| EP | 0216122 | 4/1987 |
| EP | 0335718 | 10/1989 |
| EP | 0724949 | 8/1996 |
| EP | 0705162 | 7/1998 |
| GB | 2170186 | 7/1986 |
| WO | 98/52738 | 11/1998 |

OTHER PUBLICATIONS

International Search Report.

* cited by examiner

*Primary Examiner*—Sam Chuan Yao
(74) *Attorney, Agent, or Firm*—Ostrolenk, Faber, Gerb & Soffen, LLP

(57) ABSTRACT

The invention describes a method and a device (101) for producing a longitudinal fiber web (100), in which fibers (2) are continuously applied, in the longitudinal direction, to a substrate web (6). In a pretreatment section, a relatively high tensile force (F) has to be exerted on the fibers, resulting in a relatively great strain ($\epsilon$). Before the fibers (2) are applied to the substrate web (6), the stress in the fibers is reduced. The drive for the fibers in the pretreatment section is separate from the drive for the substrate web, the transport velocity of the fibers in the pretreatment section being controlled separately as a function of the transport velocity of the substrate web, in such a manner that the transport velocity of the fibers in the relaxed state is substantially equal to the transport velocity of the substrate web in the relaxed state. The result is a longitudinal fiber web (100) which is substantially free of length differences and stress differences between the fibers (2) and the substrate web (6).

23 Claims, 6 Drawing Sheets

METHOD AND DEVICE FOR FORMING A LONGITUDINAL FIBER WEB

CROSS-REFERENCE TO RELATED APPLICATION

Figure 1:
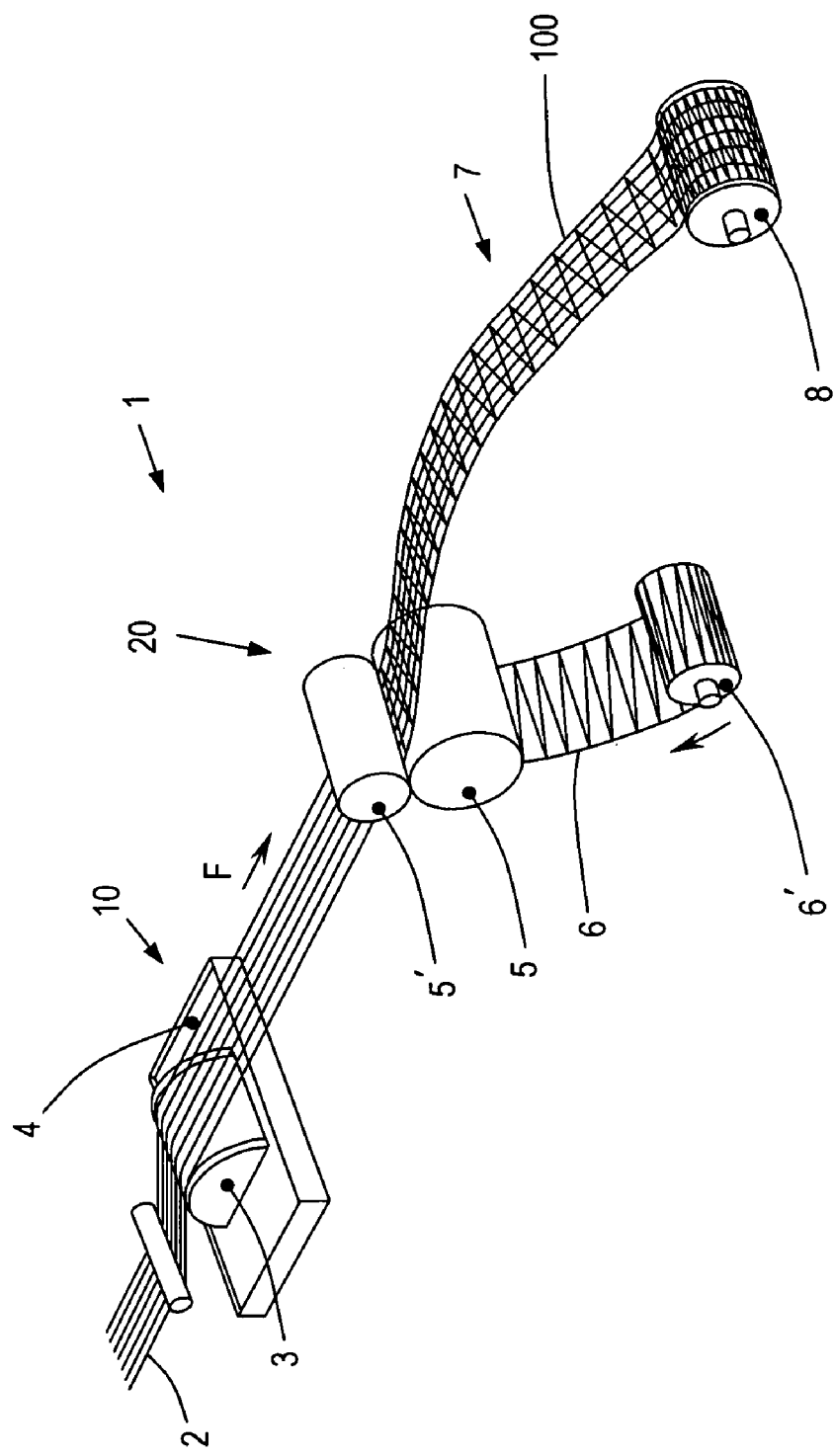

This is a continuation application of PCT/NL01/00316 filed 20 Apr. 2001, which PCT application claims priority of The Netherlands application number 1014995 filed 20 Apr. 2000.

The present invention relates in general terms to the forming of a longitudinal fibre web, a layer of substantially parallel fibres being applied to a substrate layer, and the longitudinal direction of the fibres being oriented parallel to the longitudinal direction of the web.

More particularly, the present invention relates to the forming of a web of this type in a continuous process, so that the length of this web can in principle be infinitely great. A web of this type will be referred to in the text which follows by the term "continuous" web.

The production of a longitudinal fibre web in a continuous process is known per se. Fundamentally, what this involves is fibres being deposited on one surface of a continuous web of substrate material, parallel to one another and parallel to the longitudinal direction of the substrate web, while ensuring that good, reproducible attachment occurs between the fibres and the substrate layer. The longitudinal fibre web formed in this way, that is say the combined product of substrate web and the applied layer of parallel fibres, can then be wound up into a roll.

In a process of this type, tensile farces oriented in the longitudinal direction are exerted on the fibres and on the substrate web, in order to transport the fibres and the substrate web through a production device. In this production device, by way of example, the fibres are unwound from a stock reel or yarn stenter, where the fibres are wound in the form of bundles or skeins of filament. It is desirable for these skeins or bundles to be spread open, so that the separate filaments, before being brought into contact with the substrate layer, are positioned next to one another as well as possible. For this purpose, the fibres are pulled in a meandering section over a number of spreading members, for which purpose a relatively high tensile force is required. On account of this high tensile force, a relatively great strain is produced in the fibres. Furthermore, the tensile force is exerted by a pulling roll, and on account of the high tensile force slip occurs between this pulling roll and the fibres. A lower tensile force is sufficient to transport the substrate web, so that the strain and slip occurring in the substrate web is much less. In practice, then, it has been found that the difference in strain and slip occurring in the substrate layer, on the one hand, and the fibres, on the other hand, may give rise to problems, such as for example undesirable curvature of the longitudinal fibre web. Depending on the material of the substrate layer, the relaxing fibres may also cause a greater or lesser degree of compression of the longitudinal fibre web formed.

Another problem in this connection is that a relatively high tensile force is required during winding.

A further problem which may arise is that the longitudinal fibre web formed still includes relatively high stresses and that a use product produced using the longitudinal fibre web formed has little flexibility and viability.

It is an object of the present invention to eliminate or at least reduce the above-mentioned problems.

According to an important aspect of the present invention, a tensile stress which prevails in the fibres is lowered before the fibres are applied to the substrate layer, in such a manner that the strain in the fibres is made substantially equal to the strain in the substrate layer. In this context, it is preferable for the stress in the fibres and in the substrate layer, at the position where the fibres and the substrate layer are applied to one another, to be minimal, i.e. to be no greater than is necessary for the combined web to be transported through the device.

In a preferred embodiment of the present invention, the fibres are transported to a joining location at a higher velocity than the substrate web. The relative velocity difference can be selected in order to just compensate for the differences in strain and the slip which occurs, so that in the combined longitudinal fibre web, when the strain prevailing in the materials has relaxed, there are no relative length differences. There may even be certain advantages in imparting an even higher velocity to the fibres.

A method and a device for applying two webs of film material to one another are known per se from British Patent Application 2,170,186, one of these film webs being pulled off a stock reel by a pair of laminating rolls. According to this publication, the aim is for the two webs to be applied to one another with a uniform degree of strain, in order to prevent the laminated material from curling. For this purpose, the publication describes a device in which the state of strain in one film web is measured directly, on the basis of the thickness of this film web, working on the basis that the thickness or width of a film web decreases as the strain increases. Furthermore, the device described in this publication comprises means for setting the stress state in this one film web in a controlled manner, the result of the thickness measurement being used as a control signal. For this purpose, the device described in this publication comprises, inter alia, a controllable break which acts on a stock reel; in this way, the stress state of this one film web is controlled over the entire length of this film web, from stock reel to laminating rolls.

However, this publication does not relate to the application of fibres to a substrate web. As described above, fibres, before being brought into contact with the substrate layer, are pulled in a meandering section over a number of spreading members, for which purpose a relatively high tensile force is required, so that in that meandering section a relatively great strain occurs in the fibres. It is not then possible to use the technique described in GB 2,170,186, in which, after all, the stress state is controlled over the entire length of the film web. By contrast, the present invention provides for a tensile stress prevailing in the fibres to be lowered before the fibres are joined to the substrate layer. In other words, if an observer were to travel with one fibre, he would first observe a relatively high stress state in a specific section, and would subsequently enter a section where this high stress state is lowered. When considered over the entire length of a fibre, from stock reel to joining location, this fibre therefore has a first fibre portion with a high stress state and a second fibre portion with a considerably lower stress state.

Figure 2:
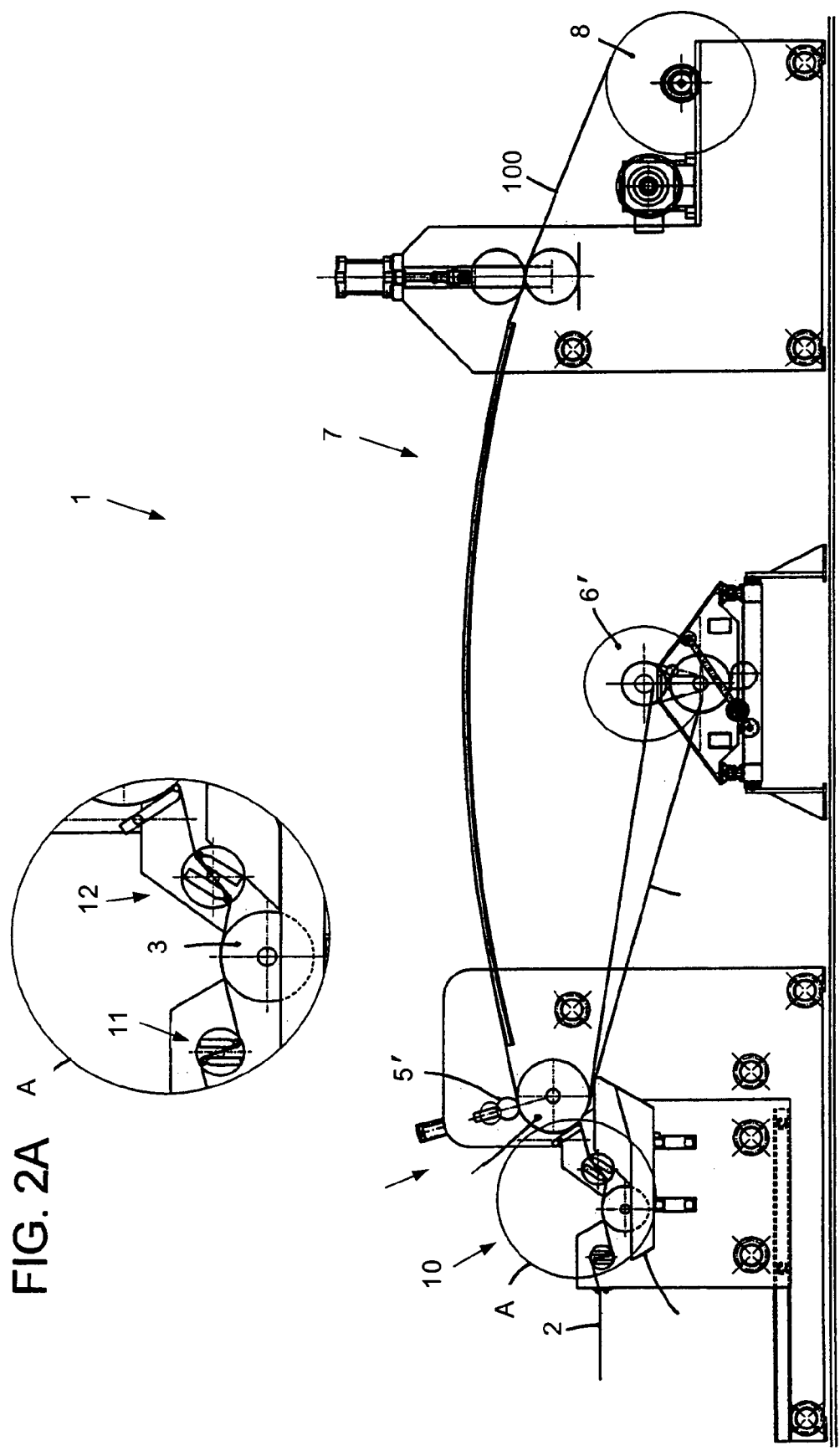
Figure 3:
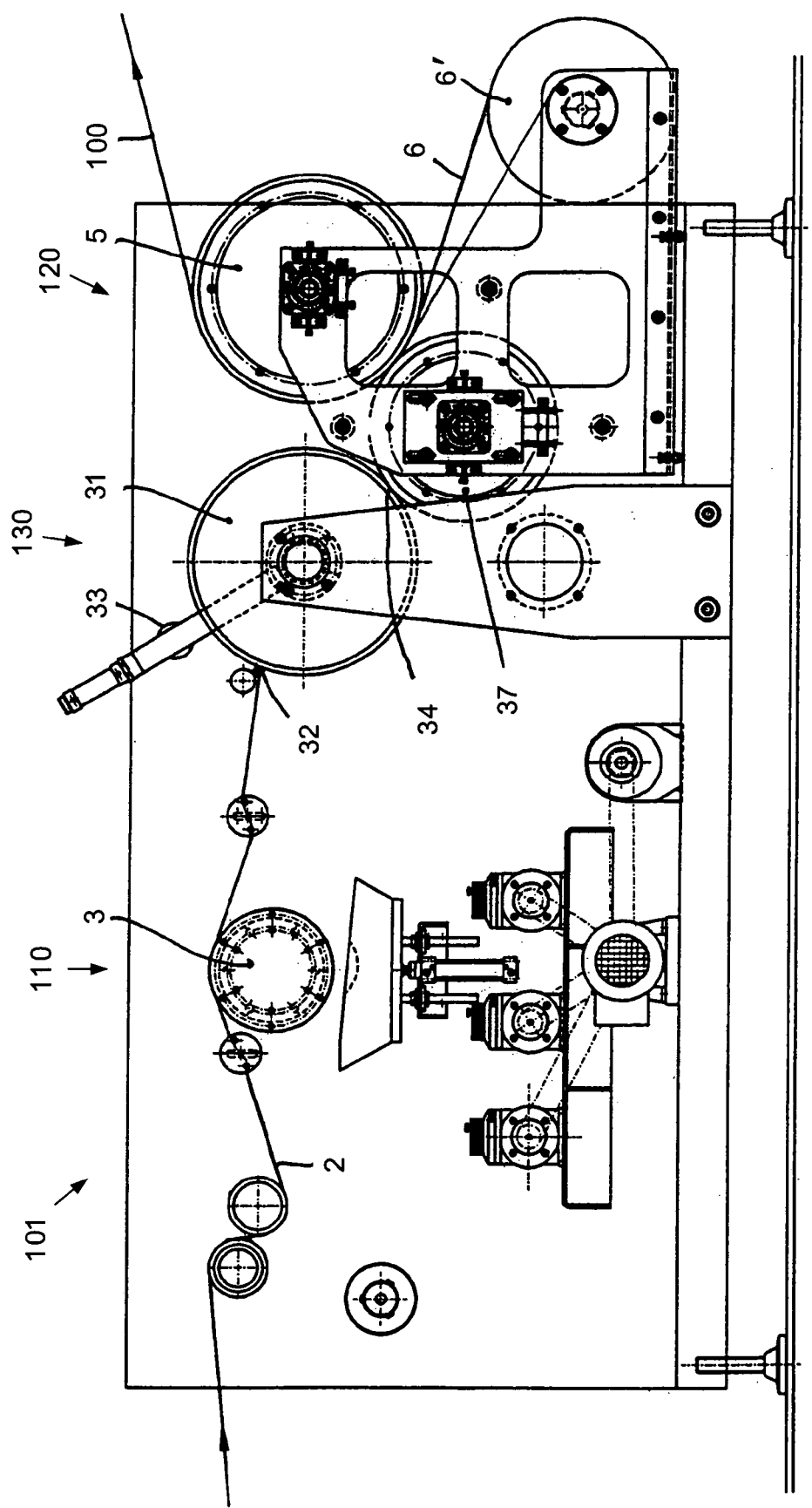
Figure 4A:
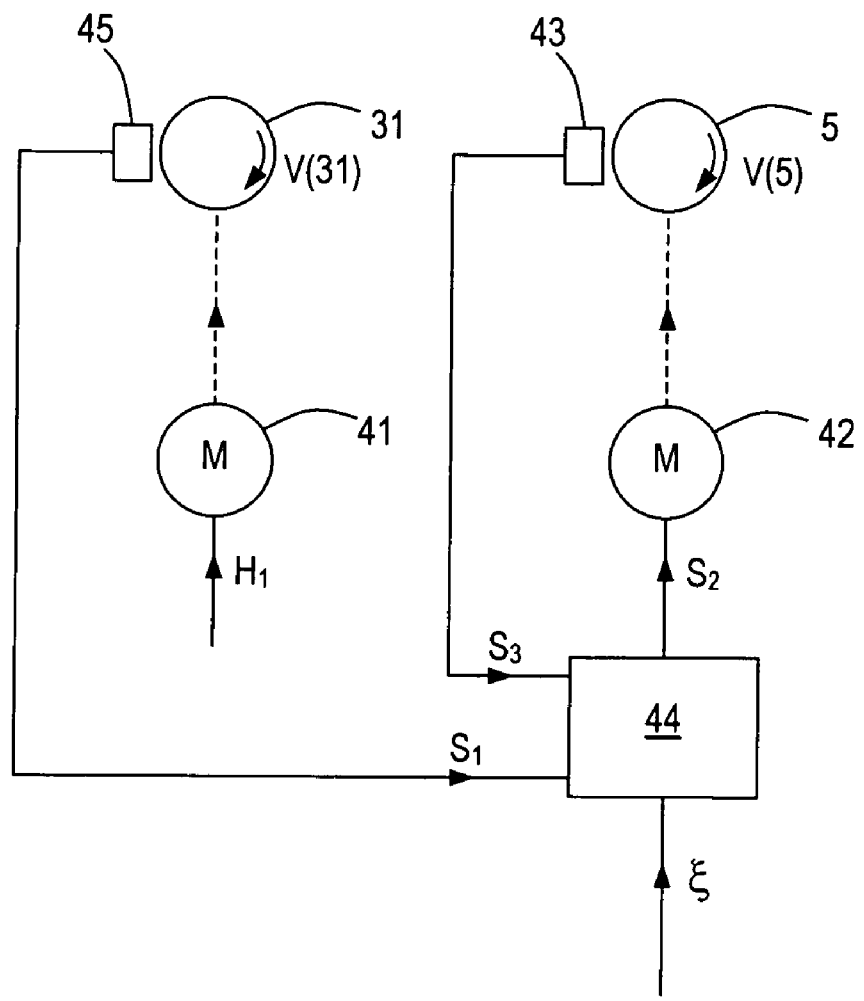
Figure 4B:
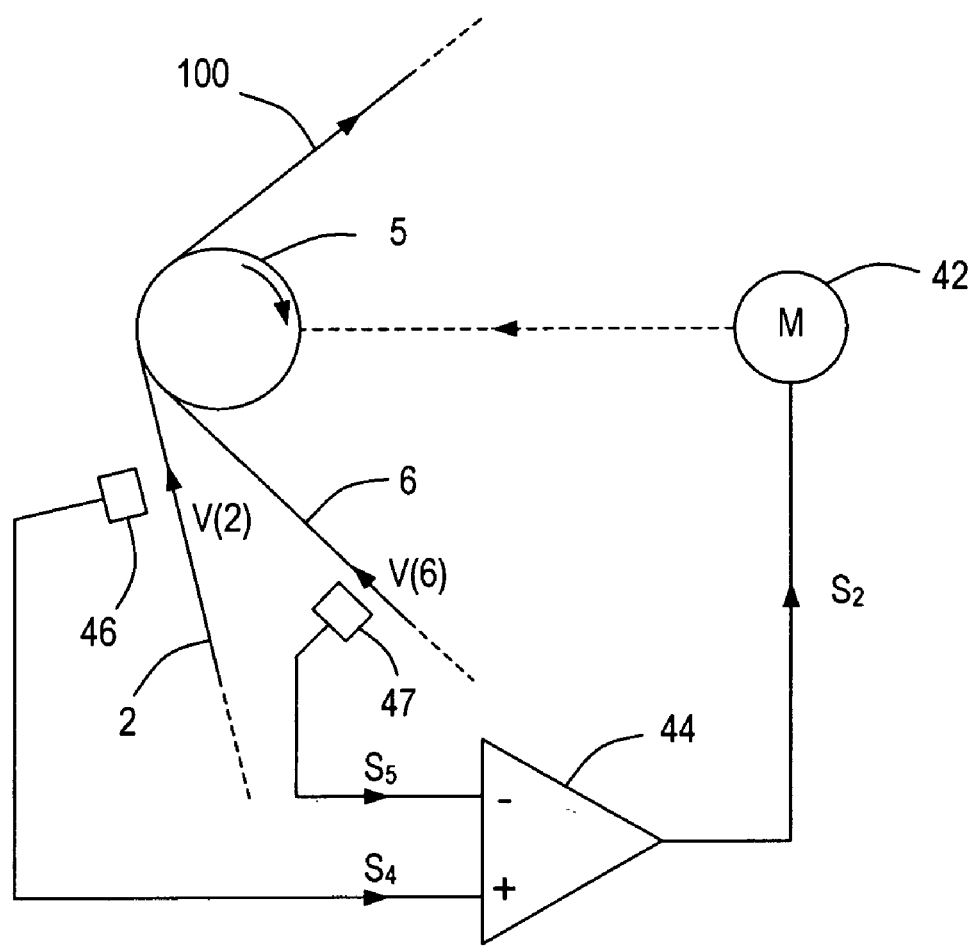
Figure 5:
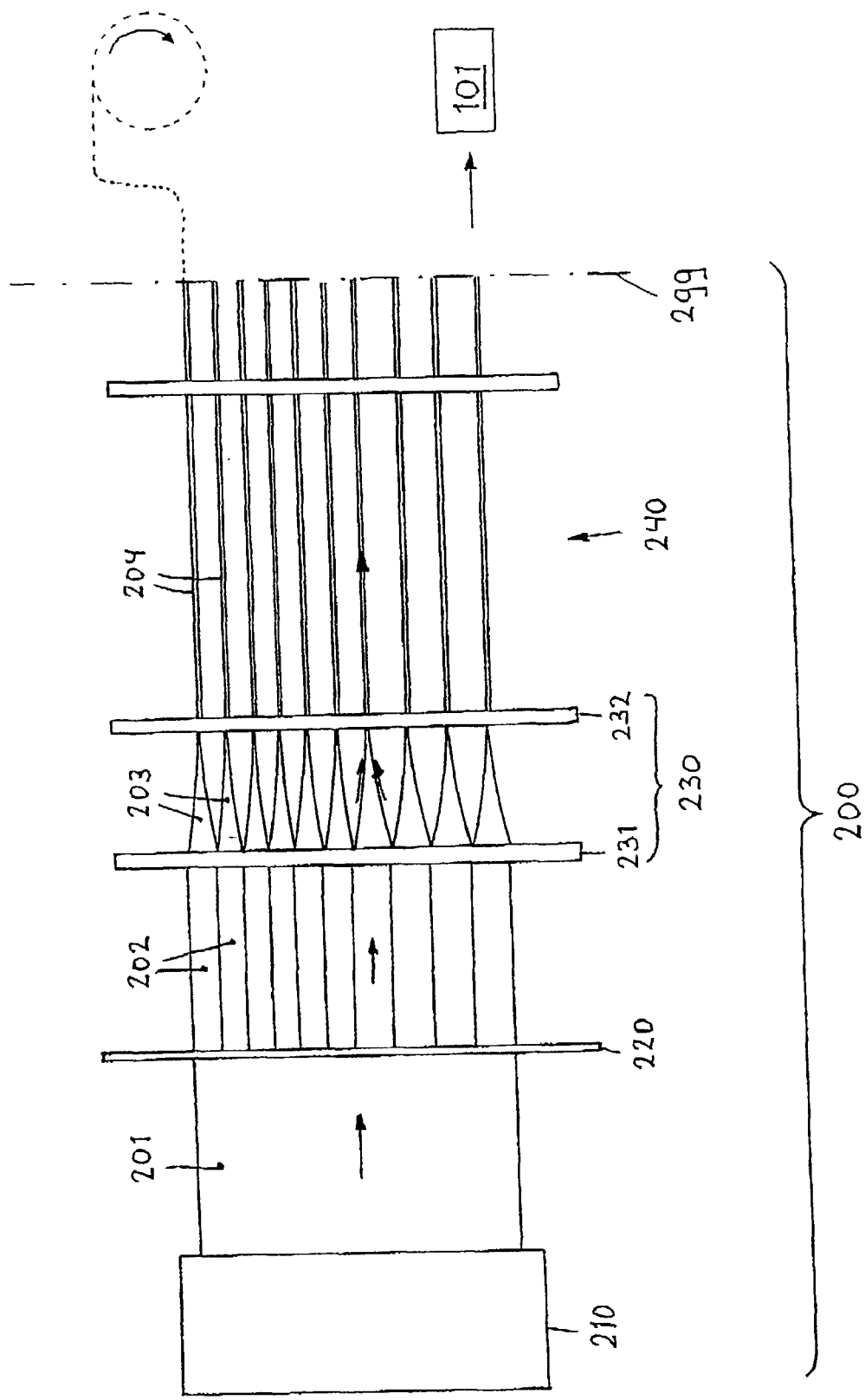

These and other aspects, characteristics and advantages of the present invention will be explained in more detail by the following description of a preferred embodiment of a device according to the invention with reference to the drawing, in which identical reference numerals denote identical or similar components and in which:

FIG. 1 is a diagrammatic perspective view of a number of components of a device for the production of a longitudinal fibre web, for illustrating a production process for longitudinal fibre webs;

FIG. 2 diagrammatically depicts a side view of a known device for producing a longitudinal fibre web;

FIG. 2A shows the detail A from FIG. 2 on an enlarged scale;

FIG. 3 diagrammatically depicts a side view, similar to that shown in FIG. 2, of a part of a production device according to the present invention for producing a longitudinal fibre web;

FIGS. 4A and 4B diagrammatically depict block diagrams of a control arrangement for the production device according to the present invention;

and FIG. 5 diagrammatically depicts a preferred embodiment of a device according to the present invention.

FIG. 1 diagrammatically depicts a possible process for the production of a longitudinal fibre web 100. The web 100 is formed from fibres, which fibres are held adjacent to one another for a predetermined total width of the longitudinal fibre web 100 to be produced which in one embodiment is, for example, approximately 1.6 meters. In this case, the longitudinal direction of the fibres corresponds to the longitudinal direction of the longitudinal fibre web. In principle, the fibres have a continuous length.

The fibres may be of various appearances. It is possible for the fibres to be formed as bundles or skeins of a plurality of filaments, in which case each filament may have a thickness of approximately 10 μm. The number of filaments in a fibre may be a few tens to a few thousand, but is typically of the order of 250–2500. Depending on the number and thickness of the filaments, the thickness of a fibre may typically lie in the range from 100 μm to a few millimeters. However, the fibres may also be of strip-like or ribbon-like form, with dimensions which are significantly larger than those of the said filaments; ribbon-like fibres typically have a thickness in the range from 10–100 μm and typically have a width in the range from 1–5 mm.

The present invention can be used for fibres of any desired form: both for fibres in bundle form and for fibres in ribbon form.

Depending on the material of the fibres, they may, in an impregnation station 10, be guided over an upper section of an impregnation roll 3, a bottom section of which is immersed in a bath containing matrix material 4. A tensile force F which is directed in the longitudinal direction of the fibres 2 is exerted on the fibres, with the result that the fibres are pulled through the impregnation station 10 in their longitudinal direction. In the process, the impregnation roll 3 rotates through the receptacle containing matrix material 4, matrix material 4 being applied to the fibres 2 which are in contact with the rotating impregnation roll 3 by this impregnation roll 3. In this way, the fibres 2 are impregnated with matrix material 4. The materials of the matrix 4 and the fibres 2 are adapted to one another in such a manner that the fibres 2 adhere well to the matrix material 4.

The impregnative fibres 2 are applied to a substrate layer 6, for which purpose the impregnated fibres 2 together with the said substrate layer 6, which is coming from a stock reel 6', are fed, in a joining station 20, to a combining roller 5, which may be provided with one or more pressure-exerting rollers 5'. The substrate layer 6 may be a web of, for example, paper, film, a nonwoven fibrous web, etc. If appropriate, the surface of the substrate layer 6 may be provided with a plastic material, which may be identical to the matrix material 4. The temperature of the combining roller 5 can then be regulated in such a manner that good adhesion between the impregnated yarns 2 and the plastic material of the substrate layer 6 is achieved.

The substrate layer 6 reaches the combining roller 5 at an earlier position than the fibres 2, as seen in the direction of rotation of the combining roller 5, which is clockwise in FIG. 2. Consequently, the substrate layer 6 is situated between the combining roller 5 and the fibres 2.

The combination of substrate layer 6 with the fibres 2 applied to it is referred to below as a longitudinal fibre web 100. This passes through a drying section 7, in which the impregnated fibres dry, and is then wound up on a roller 8.

As an alternative to impregnation, the fibres may also undergo a different form of pretreatment before being applied to the substrate layer.

For a more extensive description of a possible method for producing a longitudinal fibre web, reference is made to Dutch Patent 1006092.

At the inlet of the device, the fibres can, for example, be pulled off a stock reel or yarn stenter, which is not shown for the sake of simplicity. Irrespective of the form of the fibres, it is desirable for the layer of fibres on the substrate layer to be as thin as possible and for the fibres to rest as close as possible next to one another. In particular if the fibres are formed as bundles of a plurality of filaments, it is preferable for the layer of filaments on the substrate layer to have a thickness which is less than the thickness of these skeins or bundles, and generally it is even desirable for the layer of filaments on the substrate layer to have a thickness which corresponds to the thickness of the individual filaments. To achieve this, the bundles of filaments coming off the stock reel or yarn stenter is firstly pulled over spreading members which spread out the bundles and thus make them thinner. The greater the extent of spreading of the bundles and therefore the thinner the bundles become, the higher the tensile force which is required.

FIG. 2 shows a side view of a known device 1 for the production of a longitudinal fibre web. FIG. 2A shows, on a large scale, that the fibres 2, in the section before the impregnation roller 3, are guided past first spreading members 11, and in the section between the impregnation roll 3 and the combining roller 5 are guided past second spreading members 12, which spreading members cause relatively sharp changes in direction of the fibre, in order in this way to spread and position the fibres before the fibres reach the combining roller 5. The spreading members 11, 12 exert a relatively high frictional force on the fibres 2, so that the tensile force F which has to be exerted on the fibres 2 has to be relatively high. This tensile force F has to be supplied by the combining roller 5, in the form of a frictional force which prevails at the fibre inlet of the combining roller 5, i.e. the position where the fibres 2 reach the combining roller 5.

Along the circumference of the combining roller 5, the stress prevailing in the fibres decreases in accordance with the following formula:

$$F(\alpha)=F \cdot \exp(-f \cdot \alpha) \quad (1)$$

where f is the effective coefficient of friction between the combining roller 5 and the fibres 2, and where α is the angular distance (in radians) from the fibre inlet measured along the circumference of the combining roller 5. The same formula applies at the outlet of the combining roller 5, i.e. the point where the longitudinal fibre web 100 leaves the combining roller 5. In this case, the arc covered by the fibres 2 over the combining roller 5 has to be filled in for α. This stress has to be supplied by the winding roller 8.

As is known, tensile stress in a fibre is associated with elastic strain. In the text which follows, the relative increase in length ΔL/L, where L is the length in the stress-free state, will be used as a measure for the strain ε. The ratio between strain and tensile stress depends on the modulus of elasticity, which is a materials property.

On account of the relatively tensile force F required, the fibres 2, at the fibre inlet of the combining roller 5, are subject to a relatively high strain. Less force is required to unwind the substrate web 6 from its stock reel 6', and therefore the strain which occurs in the substrate web 6 at the location of the fibre inlet of the combining roller 5 is also much less than the strain occurring in the fibres 2. In other words, where the fibres 2 and the substrate web 6 are combined with one another, the strain on the fibres 2 is greater in relative terms than the strain on the substrate web 6. When the fibres 2 and the substrate web 6 relax into a stress-free state after they have been combined, with the strain being eliminated, so that the fibres 2 and the substrate web 6 return to their original length, problems arise on account of the fibres in the longitudinal fibre web relaxing or springing back to a greater extent than the substrate layer.

This effect is reinforced by the fact that, on account of the relatively high tensile force F required, slip occurs between the substrate web 6 and the fibres 2 at the fibre inlet of the combining roller 5.

A first object of the invention is to reduce the problems associated with the strain which occurs. To this end, the present invention proposes that, at the location where the fibres 2 and the substrate layer 6 are joined together, the strain on the fibres and the strain on the substrate layer be made substantially equal to one another.

According to a first approach in the context of the present invention, for this purpose the strain in the substrate web 6 may be increased, for example by breaking the stock reel 6', so that a greater tensile force is exerted on the substrate layer 6 at the substrate-web inlet of the combining roller 5. However, a drawback of this solution is that it causes a greater load on the machine and that the longitudinal fibre web 100 is wound onto the stock reel 8 under a very high stress. This problem could be resolved by reducing the internal tensile stress of the longitudinal fibre web 100 in a relaxation section, for example along relaxation rolls, before entering the drying section 7, so that less tensile stress is required for winding onto the reel 8.

However, another problem is that it is difficult to determine how great the strain on the substrate web 6 should be and therefore what tensile stress has to prevail in the substrate web 6.

A second object of the invention is to overcome these drawbacks as well. Furthermore, the invention seeks to resolve the problems associated with slip. For this purpose, according to the present invention, preferably the stress in the fibres 2 is reduced before the fibres 2 are joined to the substrate layer 6.

In the device according to the prior art, the tensile force F which is required in order to pull the fibres 2 through the impregnation station 10 and along the spreading members 11, 12 is supplied by the combining roller 5. In a preferred device according to the present invention, a pulling and relaxation station 130, which has the function of supplying the required tensile force F and then reducing the strain prevailing in the fibres 2 before the fibres reach the combining roller 5, is disposed between the spreading members 11, 12 of the impregnation station 10 and the combining roller 5 of the joining station 20.

FIG. 3 shows a side view of a part of a device 101 according to the present invention. On the left-hand side of the figure there is a pretreatment station 110, which may be identical to the impregnation station 10 according to the prior art and will not therefore be described in further detail. On the right-hand side of the figure there is the combining roller 5 of a joining station 120 and a longitudinal fibre web 100 which has been formed, leaving the combining roller 5. The longitudinal fibre web 100 formed is dried in a drying section and is wound up onto a reel, it being possible to use the drying section 7 and the winding reel 8 according to the prior art, which will therefore not be described in further detail.

In principle, the joining station 120 may be identical to the joining station 20 according to the prior art. From the stock reel 6', the substrate web 6 is guided to the combining roller 5, the substrate web 6 being pulled off the said stock reel 6' by the driven combining roller 5. This requires relatively little force, and the tensile stress which occurs in the substrate web 6, as well as the resultant strain in the substrate web 6, is low.

The pulling and relaxation station 130 comprises a driven pulling roll 31. From the pretreatment station 110, the fibres 2 reach an inlet 32 of the pulling roll 31, and then follow a relatively large part of the circumference of the pulling roll 31 before reaching an outlet 34 of the pulling roll 31. The arc covered may be of a magnitude in the range from 180° to 270°, preferably being at least 200°. Preferably, one or more pressure-exerting rollers 33 are arranged along this circumference. The surface of the pulling roll 31 is selected in relation to the material of the fibres 2 and the liquid matrix material so as to supply a good coefficient of friction: this material may, for example, be a rubber, but may also be a stainless steel.

The pulling roll 31 pulls the fibres 2 through the pretreatment station 110, so that at the inlet 32 of the pulling roll 31 a relatively high tensile stress prevails in the fibres 2, so that these fibres are under a relatively great strain E at the inlet 32 of the pulling roll 31. At the outlet 34 of the pulling roll 31, the stress in the fibres 2, and the associated strain E, has decreased considerably, in accordance with the abovementioned formula (1).

In known devices, the tensile force exerted on the fibres in fact has to be supplied by the frictional force which is generated by the surface of the substrate layer. Since in this case the coefficient of friction is relatively low, there is a relatively large amount of slip. Therefore, the present invention already offers the advantage that the tensile force is now supplied by a separate pulling roll, the surface of which can be selected to have a higher coefficient of friction, so that the slip which occurs between fibres and pulling roll will be lower than the slip between fibres and substrate layer which occurs in the known device.

In the text which follows, the slip which occurs between fibres and pulling roll will be designated as a velocity ratio η, defined as the ratio between the peripheral velocity v(31) of the pulling roll 31 and the linear velocity v(32) of the stretched fibres 2 at the inlet 32 of the pulling roll 31:

$$\eta = v(31)/v(32) \qquad (2)$$

The fibres 2 could be transferred directly from the outlet 34 of the pulling roll 31 to the fibre inlet of the combining roller 5. It will be clear to a person skilled in the art that the position of the pulling roll 31 with respect to the combining roller 5 must then differ from that illustrated in FIG. 3, and that in this case the direction of rotation of the pulling roll 31 must be opposite to that of the combining roller 5. According to the inventive idea, this already provides the advantage that the strain in the fibres is reduced before they reach the combining roller 5. In the embodiment illustrated in FIG. 3, the pulling and relaxation station 130 comprises an intermediate roll 37 which is arranged between the pulling roll 31 and the combining roller 5, and the fibres 2, before reaching the combining roller 5 from the pulling roll 31 for the purpose of being joined to the substrate web 6, are guided along this intermediate roll 37. This allows further relaxation of the fibres 2.

In principle, its is possible to add more intermediate rollers, but tests have shown that this is not necessary to achieve the effect of lowering the stress prevailing in the fibres 2 at the fibre inlet of the combining roller 5 to such an extent that the fibres are under at most only a low strain which is very similar to the low strain in the substrate layer 6 at the location of the fibre inlet of the combining roller 5. A low tensile force is then sufficient to wind up the combined longitudinal fibre web 100.

A significant aspect of the present invention is that the tensile force F which is to be exerted on the fibres 2 is supplied by a pulling roll 31 arranged in front of the combining roller 5, and that the fibres 2 can relax before reaching the combining roller 5. Another significant aspect of the present invention is that it is now possible for the fibres to be provided to the combining roller 5 in such a manner that the linear velocity in the relaxed state corresponds to the linear velocity of the substrate layer in the relaxed state.

Since the tensile force required to pull the substrate web 6 off the stock reel 6' is relatively low, the strain in the substrate web caused as a result is negligible. If the peripheral velocity of the combining roller 5 is denoted as v(5), the length L of the substrate web 6 which reaches the combining roller 5 in a time interval τ can be denoted as L=τ·v(5), and the same length leaves the combining roller 5. In the device according to the prior art, the fibres 2 reach the inlet of the combining roller 5 in the stressed state. This means that in the same time interval τ, the length of the fibres which reach the combining roller 5 in the stressed state is equal to L=τ·v(5), but if these fibres are relaxed, their length which is processed in that time interval is only L/(1+ε).

As a result of the pulling roll 31 being driven at a peripheral velocity v(31) which is higher than the peripheral velocity v(s) of the combining roller, in such a manner that v(31) is substantially equal to η·(1+ε)·v(5), so that the type of velocity v(32) at the inlet 32 of the pulling roll 31 is substantially equal to (1+ε)·v(S), it is ensured that the length of the fibres which reach the fibre inlet of the combining roller 5 in the relaxed state is substantially equal to L=τ·v(5). Moreover, on account of the reduced stress in the fibres 2, there will now be scarcely any slip between the fibres 2 and the substrate layer 6 at the fibre inlet of the combining roller 5. The overall result of the present invention is that in the longitudinal fibre web 100 produced there are scarcely any further differences in length and differences in stress between the fibres and the substrate layer.

The intermediate roll 37 rotates at a peripheral velocity which corresponds to the peripheral velocity of the combining roller 5. For this purpose, the intermediate roll 37 may be a roll which is driven by a motor, but the intermediate roll 37 may also be a free-running roll which is pressed onto the combining roller 5, so that the intermediate roll 37 is driven by the rotating combining roller 5.

In principle, it is possible for the pulling roll 31 and the combining roller 5 to be driven at the same angular velocity, while the pulling roll 31 has a larger diameter than the combining roller 5, in order in this way to bring about the different peripheral velocities. The diameter D(31) of the pulling roll 31 would then have to be substantially equal to η·(1+ε)·D(5), where D(5) is the diameter of the combining roller 5. On the other hand, in principle it is also possible for the pulling roll 31 and the combining roller 5 to have identical diameters, but to be driven at different angular velocities in order in this way to bring about the difference in the peripheral velocities. The angular velocity ω(31) of the pulling roll 31 would then have to be substantially equal to η·(1+ε)·ω(5), where ω(5) is the angular velocity of the combining roller 5.

In both cases, however, it is a drawback that the strain which occurs in the fibres 2 and the slip which occurs have to be accurately known in advance and that the device cannot be flexibly adapted to changes in the relative strain of the fibres 2 and the slip which occurs, for example as a result of changes in the materials used.

Preferably, therefore, at least one of the driven rolls is provided with a drive control system, in which the rotational speed of the other driven roll is measured and the rotational speed of the said one roll is regulated in a fixed ratio to the measured rotational speed of the other roll.

FIG. 4A illustrates this for an example in which the pulling roll 31 is driven at a predetermined rotational speed by means of a motor 41, which rotational speed, depending on production requirements, can be set manually to a higher or lower level, as indicated by H1. Furthermore, this speed may in principle be susceptible to variations over the course of time. The instantaneous rotational speed of the pulling roll 31 is measured using a sensor 45, which provides a measurement signal S1 to a control unit 44, for example a microcontroller or the like. The control unit 44 generates a control signal S2 for a motor 42 which drives the combining roller 5. The said control unit 44 is designed to generate the said control signal S2 in such a manner that the peripheral velocity of the combining roller 5 has the correct ratio with respect to the peripheral velocity of the pulling roll 31. If desired, the rotational speed of the combining roller 5 could be measured using a roller sensor 43 which generates a feedback signal S3 for the control unit 44.

Instead of a separate motor 42, it would also be possible to use a transmission system which connects the combining roller 5 to the first motor 41, in which case the transmission ratio of the said transmission system is variable and is controlled by the control unit 44.

The ratio between the peripheral velocity of the combining roller 5 and the peripheral velocity of the pulling roll 31, which is referred to below as ξ, may be a predetermined constant value, but it is also possible for this ratio to be a manually adjustable constant, as is diagrammatically indicated.

While the device is being started up, the ratio ξ required can be determined relatively easily using tests. Initially, ξ and therefore the rotational speed of the combining roller 5 are set at a level which is too low, which can be visually discerned by the fact that the fibres 2 hang loosely between the pulling roll 31 and the intermediate roll 37 and/or between the intermediate roll 37 and the combining roller 5. Then, ξ and therefore the relative rotational speed of the combining roller 5 are increased, until the fibres 2 are just taut. A significant advantage of this adjustment procedure is that it is not necessary to know the exact values of the strain ξ which occurs in the fibres 2.

The adjustment procedure described can be carried out at a relatively low transport velocity of the longitudinal fibre web 100 formed, since the set value ξ is in principle independent of this transport velocity and is therefore independent of the production rate. If it is desirable to increase the production rate, it is sufficient to increase the speed of the motor 41 (H1); the control unit 44 will automatically adapt the velocity of the combining roller 5 in a suitable way to the increased velocity of the pulling roll 31.

It will be clear that a similar adjustment procedure is possible if the rotational speed of the pulling roll is derived from the rotational speed of the combining roller.

The above text has described that the fibres 2 may come from a stock reel or yarn stenter. This implies that the fibres, after they have been produced, are wound up onto a stock reel or onto yarn bobbins of a yarn stenter, and that to be applied to a substrate layer they have to be pulled off a reel or bobbin of this type. Furthermore, this implies that the length of a fibre web which can be produced continuously without intervention is primarily limited to the length of the fibre which can be wound onto a stock reel or bobbin. When the reel or bobbin is empty, it has to be replaced by a new one and the start of a new fibre has to be introduced into the device.

However, the device according to the present invention is eminently suitable for positioning immediately downstream of an extrusion production device, so that winding and unwinding can be avoided, while a greater web length becomes more readily possible.

This is explained in more detail with reference to the diagrammatic illustration provided in FIG. 5. FIG. 5 diagrammatically depicts a production device 200, which comprises an extruder 210 which, in this illustrated example, supplies a flat film 201. In a cutting device 220 the flat film 201 is cut into narrow ribbons 202. In a stretching station 230, the narrow ribbons 202 are stretched; the stretching station 230 is in this case illustrated as a combination of two successive sets 231, 232 of pinch rollers, the second set of pinch rollers 232 having a greater transport velocity than the first set of pinch rollers 231. As a result of the stretching, the fibres 203 acquire their desired width, strength and rigidity; it should be clear that there is in this case a high tensile stress in the fibres 203.

Then, the fibres 204 pass through a relaxation section 240, in order to reduce the tensile stress prevailing in the fibres 204. The fibres then reach the outlet 299 of the production device 200.

Normally, the fibres would be guided from this outlet 299 to a winding station, in order to be wound onto a reel or bobbin; this is illustrated in dashed lines in FIG. 5. According to the present invention, by contrast, the fibres produced can be guided directly from the outlet 299 to the pretreatment station 110 of the device 100 illustrated in FIG. 3.

It is therefore also possible for the flat film 201 to be provided on its two surfaces with an adhesion layer, so that the fibres formed can be laminated directly onto the substrate 6; in this case, the impregnation roll 3 could be omitted.

In the example discussed with reference to FIG. 5, the extruder 210 is a device of the type which supplies a [sic] flat film 201, so that the fibres 204 formed are ribbon-like fibres with a width of typically 2–3 mm. If the intention is for the production device 200 to supply filaments, the extruder 201 will be of a different type. More particularly, the extruder 210 will then have an extrusion head provided with many dies, supplying pre-filaments, i.e. thread-like extrusion products with a thickness which is greater than the desired thickness of the filaments to be supplied. In a similar manner to that discussed above in connection with the ribbon-like fibres, the pre-filaments are stretched into filaments in a stretching station 230. Therefore, the construction of the product ion device 200 remains in principle identical, except that the cutting device 220 can be omitted.

For a more detailed description of various processes for producing fibres, reference is made to the book "Synthetische Fasern" [Synthetic Fibres] by F. Fourne, 1995, ISBN 3-446-16058-2.

Therefore, the present invention provides a method and a device 101 for the production of a longitudinal fibre web 100, in which continuous fibres 2 are applied in the longitudinal direction to a substrate web 6. In a pretreatment section, a relatively high tensile force F has to be exerted on the fibres, resulting in a relatively great strain E. Before the fibres 2 are applied to the substrate web 6, the stress in the fibres is reduced. The driving of the fibres in the pretreatment section is separate from the driving of the substrate web, the transport velocity of the fibres in the pretreatment section being regulated separately as a function of the transport velocity of the substrate web, in such a manner that the transport velocity of the fibres in the relaxed state is substantially equal to the transport velocity of the substrate web in the relaxed state. The result is a longitudinal fibre web 100 which is substantially free of length differences and stress differences between the fibres 2 and the substrate web 6.

The above text, with reference to FIG. 4A, has explained that the pulling roll 31 and the combining roller 5 can be driven separately, in such a manner that there is a constant, predetermined ratio $\xi$ between their peripheral velocities v(5). In this case, therefore, v(31) and v(5) are control parameters, and there are peripheral velocity detectors 45 and 43. However, it is also possible for the linear velocities of the substrate layer 6 and the fibres 2 to be used as control parameters, as illustrated in FIG. 4B. In this exemplary embodiment, the device comprises a first transport velocity detector 46 which is associated with the fibres 2 and measures the linear transport velocity v(2) of the fibres 2 just before the fibre inlet of the combining roller 5, as well as a second transport velocity detector 47 which is associated with the substrate web 6 and measures the linear transport velocity v(6) of the substrate web. The first transport velocity detector 46 associated with the fibres 2 provides a first measurement signal S4 which is representative of the linear transport velocity v(2) of the fibres 2 just before the fibre inlet of the combining roller 5, i.e. in the relaxed state, and the second transport velocity detector 47 associated with the substrate web 6 provides a second measurement signal S5 which is representative of the linear transport velocity v(6) of the substrate web 6. The control unit 44 receives both measurement signals S4 and S5 and is designed to generate a control signal S2 for the combining-roller drive motor 42, and therefore to control the rotational speed of the combining roller 5, in such a manner that the two measurement signals S4 and S5 are substantially identical to one another, meaning that the linear transport velocity v(2) of the fibres 2 just before the fibre inlet of the combining roller 5 is substantially equal to the linear transport velocity v(6) of the substrate web 6. It is then not necessary to determine a velocity factor $\xi$, and an initial setting procedure can be omitted.

The control unit 44 may then be designed as a simple differential amplifier, which receives the first measurement signal S4 at its non-inverting input and receives the second measurement signal S5 at its inverting input. The rotational speed of the combining roller 5 then no longer needs to be measured.

It will be clear that in this case too there is a possible variant in which the combining-roller drive motor 42 is driven as the master and the pulling-roll drive motor 41 is driven as the slave.

Furthermore, instead of the linear transport velocity v(6) of the substrate web 6, it would also be possible to use the peripheral velocity v(5) of the combining roller 5 as the reference velocity.

The above text has explained how it is possible, within the scope of the present invention, to apply the fibres in virtually stress-free form to the substrate layer, so that in the finished product (the longitudinal fibre web) length differences and stress differences between the fibres, on the one hand, and the substrate web, on the other hand, are substantially eliminated. Consequently, a use product made from the longitudinal fibre webs produced according to the present invention can be more flexible than a use product made from the longitudinal fibre webs produced according to the prior art, which already represents an advantage.

There are use products which in practice can be subjected to relatively high impact loads. An example of a use product of this nature is an airbag. This load, then, results directly in an impact stress load in the fibres. The present invention provides a longitudinal fibre web in which impact loads are initially absorbed by the substrate layer and only exert a load on the fibres at a subsequent stage. For this purpose, when the fibres 2 are being combined with the substrate layer 6, a greater fibre length compared to the length of substrate web is deliberately supplied. The intention is for the velocities of the pulling roll 31 and of the combining roller 5 to be controlled in such a manner that, in the relaxed state of the longitudinal fibre web 100 formed, the length of the fibres is greater than the length of the substrate web 6.

It will be clear that then, in a finished longitudinal fibre web 100, the fibres 2 are completely free of stress. Consequently, the longitudinal fibre web is even more flexible: bending is now even easier, since the fibres 2 will not be directly subjected to tensile stress. If a use product, such as an airbag, is subjected to a load, an increase in the length of the longitudinal fibre web will initially cause a tensile stress only in the fibre web, until the fibre web has been stretched to such an extent that the fibres 2 are taut; only then will a further increase in the length of the longitudinal fibre web also cause a tensile stress in the fibres.

The additional length of the fibres 2 with respect to the substrate layer 6 will be expressed here by the parameter $\lambda$ in accordance with the following formula:

$$L(2) = (1+\lambda)L(6) \quad (3)$$

where $L(2)$ is the length of the fibres 2 corresponding to a length $L(6)$ of the substrate web 6 in the stress-free state.

The additional length can be set in the range from one hundredth of a percent to of the order of 5%; preferably, $\lambda$ is selected in the range from 0.001 to 0.01.

On account of the additional length, the fibres 2 will be of wave form on the substrate layer 6. This wave form may also be desirable for aesthetic reasons in decorative applications of the longitudinal fibre web according to the present invention.

A transverse fibre web can be produced from the improved longitudinal fibre web according to the present invention, for example by cutting web segments from a continuous longitudinal fibre web and then attaching these web segments to one another again by means of their original side edges. In the web which is then formed, the fibres form an angle with respect to the longitudinal direction of the web, corresponding to the angle of the cutting line along which the original continuous longitudinal fibre web was cut into segments, which angle is preferably equal to 90°.

An example of a known technique for producing a transverse fibre web is described in EP-B-0,705,162. First of all, a composite web is produced, in which a longitudinal fibre web is applied to a substrate layer which can absorb forces in a direction perpendicular to the direction of the fibres. Then, segments of a predetermined length are cut from the composite web. Then, the substrate layers of these segments, with their longitudinal edges adjoining one another, are attached to one another. Finally, a third layer is applied to the fibre layers of the segments which have been attached to one another. Then, the substrate layer is removed.

Other processes for producing a transverse fibre web are also conceivable.

A transverse fibre web produced from segments of a longitudinal fibre web according to the present invention offers advantages with respect to the known transverse fibre webs.

According to the present invention, it is also possible to make a crosslaid fabric starting from a longitudinal fibre web according to the present invention. A crosslaid fabric comprises two or more layers of fibres, the fibres in one layer forming an angle with the fibres in another layer. In one embodiment, the fibres in a first layer are parallel to the longitudinal direction of the web, and the fibres in another layer form an angle which is greater than zero and is preferably 90° with respect to the longitudinal direction of the web. The first layer may be a longitudinal fibre web according to the present invention, and the other layer may be a transverse fibre web according to the present invention.

It will be clear to a person skilled in the art that the scope of the present invention is not restricted to the examples which have been discussed above, but rather various alterations and modifications to these examples are possible without departing from the scope of the invention as defined in the appended claims. For example, it is possible for the fibres 2 on the combining roller 5 to be situated between the surface of the combining roller 5 and the substrate web 6, if the fibres 2 reach the combining roller 5 earlier than the substrate web 6.

The above text has referred to an impregnation treatment as an example of a pretreatment; an alternative example of a pretreatment could be the application of a coating. The spreading of the fibre bundles per se is already also a pretreatment.

In the above text, it has been explained that a fibre may be formed as a bundle of a plurality of filaments. When discussing the problems and when discussing the measures proposed by the present invention for solving these problems, it makes little sense to draw a specific distinction between the filaments and the fibres; after all, a strain occurs both in the fibres and in the individual filaments, and a stressed state prevails in both the fibres and in the individual filaments, and relaxation occurs in both the fibres and the individual filaments. Therefore, in the above discussion of the exemplary embodiments, the term "fibre" has always been employed, for the sake of simplicity. However, one could also state that, if the individual filaments are arranged next to one another on the substrate layer, strictly speaking a "fibre" is no longer involved. Therefore, it is expressly stated that in the claims which follow the term "fibre" indicates not only a bundle of filaments but is deemed to refer to the individual filaments as well.

What is claimed is:

1. A method for forming a longitudinal fiber web, in which a layer of substantially parallel fibers is applied to a substrate layer, in which the longitudinal direction of the fibers is oriented substantially parallel to the longitudinal direction of the substrate layer, the method comprising applying the fibers to the substrate layer, lowering a tensile stress which prevails in the fibers before the fibers are joined to the substrate layer, in a manner such that strain in the fibers is made substantially equal to strain in the substrate layer.

2. The method according to claim 1, wherein the fibers are joined to the substrate layer substantially in a relaxed state.

3. A method according to claim 1, further comprising exerting a tensile force on the fibers to pull the fibers through a pretreatment section before they are joined to the substrate layer, and moving the fibers through the pretreatment section at a first transport velocity of the fibers greater than a second transport velocity of the substrate layer.

4. The method according to claim 3, comprising joining the fibers and the substrate layer on a combining roller, and exerting the tensile force on the fibers by a pulling roll arranged in front of the combining roller, and setting a first peripheral velocity of the combining roller at a lower level than a second peripheral velocity of the pulling roll.

5. The method according to claim 3, comprising controlling the velocity of the fibers in the pretreatment section such that a third velocity of the fibers, at a location at or just before the joining position, is substantially equal to a fourth velocity of the substrate layer.

6. A method for forming a longitudinal fiber web, in which a layer of substantially parallel fibers is applied to a substrate layer and in which the longitudinal direction of the fibers is oriented substantially parallel to the longitudinal direction of the substrate layer; the method comprising:
  lowering a tensile stress prevailing in the fibers before the fibers are joined to the substrate layer such that a strain in the fibers is caused to be substantially equal to a strain in the substrate layer;
  applying the fibers to the substrate layer, joining the fibers to the substrate layer with the fibers substantially in a relaxed state;
  and for each unit of length of the substrate layer, the mean length of the fibers applied thereto is substantially equal to the respective unit of length of the substrate layer.

7. A method according to claim 6, further comprising exerting a tensile force on the fibers to pull the fibers through a pretreatment section before joining the fibers to the substrate layer, and transporting the fibers in the pretreatment section at a first transport velocity greater than a second transport velocity of the substrate layer.

8. The method according to claim 7, comprising joining the fibers and the substrate layer on a combining roller, and exerting the tensile force on the fibers by a pulling roll arranged in front of the combining roller, and setting a first peripheral velocity of the combining roller at a lower level than a second peripheral velocity of the pulling roll.

9. The method according to claim 7, comprising controlling the velocity of the fibers in the pretreatment section such that a third velocity of the fibers, at a location at or just before the joining position, is substantially equal to a fourth velocity of the substrate layer.

10. A method for forming a longitudinal fiber web, in which a layer of substantially parallel fibers is applied to a substrate layer and in which the longitudinal direction of the fibers is oriented substantially parallel to the longitudinal direction of the substrate layer; the method comprising:
  lowering a tensile stress prevailing in the fibers before the fibers are joined to the substrate layer such that a strain in the fibers is caused to be substantially equal to a strain in the substrate layer;
  applying the fibers to the substrate layer, joining the fibers to the substrate layer with the fibers substantially in a relaxed state;
  and for each unit of length of the substrate layer, the mean length of the fibers applied thereto is greater than the unit of length of the substrate layer.

11. The method according to claim 10, wherein the mean length of the fibers is 0.01% to 5% greater than the unit of length of the substrate layer.

12. The method according to claim 10, further comprising exerting a tensile force on the fibers to pull the fibers through a pretreatment section before they are joined to the substrate layer, and moving the fibers through the pretreatment section at a first transport velocity of the fibers greater than a second transport velocity of the substrate layer.

13. The method according to claim 12, comprising joining the fibers and the substrate layer on a combining roller, and exerting the tensile force on the fibers by a pulling roll arranged in front of the combining roller, and setting a first peripheral velocity of the combining roller at a lower level than a second peripheral velocity of the pulling roll.

14. The method according to claim 12, comprising controlling the velocity of the fibers in the pretreatment section such that a third velocity of the fibers, at a location at or just before the joining position, is greater than a fourth velocity of the substrate layer.

15. A method for applying a layer of fibers to a substrate layer having a longitudinal direction, wherein the fibers are substantially parallel and have a longitudinal direction of the fibers oriented substantially parallel to the longitudinal direction of the substrate layer,
  the method comprising the steps of:
  exerting a tensile force on the fibers to pull the fibers through a pretreatment section at a first fiber transport velocity;
  moving the substrate layer at a second substrate transport velocity;
  joining the fibers and the substrate layer on a combining roller;
  wherein the first fiber transport velocity in the pretreatment section is higher than the second substrate transport velocity;
  wherein the tensile force is exerted on the fibers by a pulling roll arranged upstream of the combining roller;
  wherein the combining roller has a first peripheral velocity set at a lower level and the pulling roll has a second peripheral velocity at a higher level;
  and wherein a tensile stress prevailing in the fibers is lowered before the fibers are joined to the substrate layer such that a strain in the fibers is caused to be substantially equal to a strain in the substrate layer.

16. The method according to claim 15, wherein the fibers are joined to the substrate layer substantially in a relaxed state.

17. The method according to claim 16, wherein, for each unit of length of the substrate layer, the mean length of the fibers applied thereto is substantially equal to this unit of length of the substrate layer.

18. The method according to claim 16, wherein, for each unit of length of the substrate layer, the mean length of the fibers applied thereto is substantially larger than the unit of length of the substrate layer, the mean length of the fibers in relative terms being 0.01% to 5% larger than the unit of length of the substrate layer.

19. The method according to claim 15, further comprising controlling the velocity of the fibers in the pretreatment section such that a third velocity of the fibers, at a location at or just before a position of the joining, is substantially equal to a fourth velocity there of the substrate layer.

20. The method according to claim 15, further comprising controlling the velocity of the fibers in the pretreatment section such that a third velocity of the fibers, at a location at or just before a position of the joining, is higher than a fourth velocity there of the substrate layer.

21. The method according to claim 15, further comprising forming a longitudinal fiber web from the fibers applied to the substrate layer.

22. The method according to claim 21, further comprising cutting web segments from the longitudinal fiber web to form a transverse fiber web.

23. The method according to claim 15, further comprising, forming a first longitudinal fiber web from the fibers applied to the substrate layer; and forming a second longitudinal fiber web from the fibers applied to the substrate layer;

cutting web segments from the second longitudinal fiber web;

and arranging the web segments on the first longitudinal fiber web to form a crosslaid fabric which comprises at least two layers of the fibers, comprised of a first layer in which the fibers are parallel to the longitudinal direction of the web and a second layer in which the fibers form an angle with respect to the longitudinal direction of the web.

* * * * *